No. 612,539. Patented Oct. 18, 1898.
T. G. BOWICK.
PROPELLING AND STEERING BOATS.
(Application filed Dec. 29, 1897.)
(No Model.)
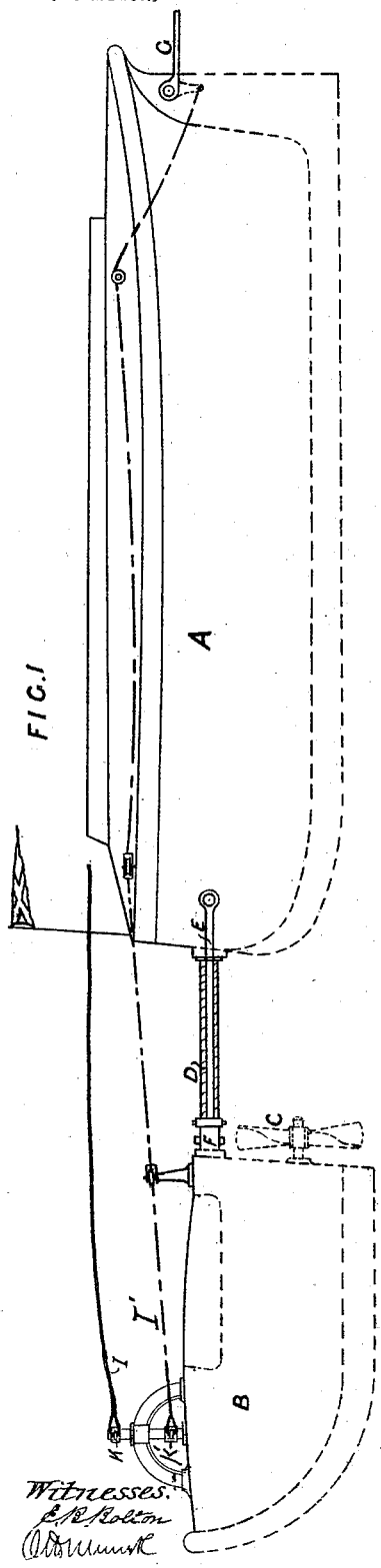
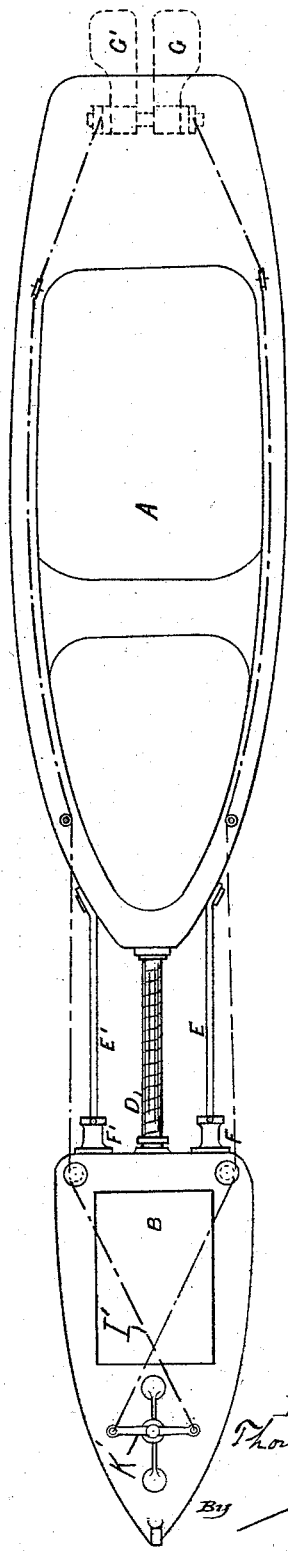
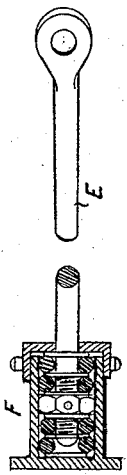
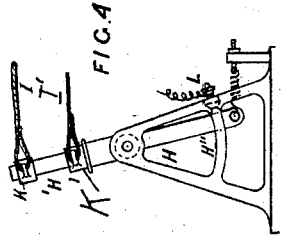
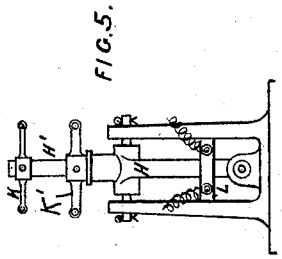

UNITED STATES PATENT OFFICE.

THOMAS GILBERT BOWICK, OF LONDON, ENGLAND.

PROPELLING AND STEERING BOATS.

SPECIFICATION forming part of Letters Patent No. 612,539, dated October 18, 1898.

Application filed December 29, 1897. Serial No. 664,252. (No model.) Patented in England May 18, 1897, No. 12,269, and in France May 29, 1897, No. 267,387.

*To all whom it may concern:*

Be it known that I, THOMAS GILBERT BOWICK, merchant, of No. 7 Great Winchester street, London, England, have invented certain new and useful Improvements in and Connected with the Propelling and Steering of Ships, Boats, and the Like, (for which I have obtained a patent in England, bearing date the 18th day of May, 1897, and numbered 12,269, and in France, bearing date the 29th day of May, 1897, and numbered 267,387,) of which the following is a specification.

My invention relates to improvements in and connected with the propelling and steering of ships, boats, and other vessels; and its principal objects are to facilitate the steering and control of such vessels and to reduce the vibration generally attending the same when propelled by an engine or motor as hitherto constructed.

The invention consists in the special arrangements hereinafter more fully described of seating the motor upon a separate float or vessel connected to and propelling or drawing the passenger or goods vessel, the steering and control of the float being determined from the vessel. Hinged or pivoted brakes are also arranged upon the sides of the passenger or goods vessel or on the float, (or on both,) preferably above the water-line, capable of being swung or lowered in the water, so as to act as retarding devices, or the steering may be effected by means of a rudder attached to the rear of the passenger vessel, the rudder-lines being connected to a suitable yoke or steering-gear arranged upon the float.

Referring to the drawings which form part of this specification, Figure 1 represents a side elevation of a passenger-boat drawn by a motor situated upon a float or separate vessel and connected thereto by a coupling, Fig. 2 being a plan of the same as seen from above. Fig. 3 represents an enlarged view of one of the spring coupling-boxes in section with rod shown in position. Fig. 4 is a side elevation of a device for controlling the motive power and the steering by means of reins from the boat, Fig. 5 being a front view of same.

In carrying out my invention I arrange the motor, fitted with suitable gear and a suitable propeller, upon an independent float propelling or drawing the passenger or goods vessel, as will be hereinafter explained. Such an arrangement is illustrated upon the drawings, A being the passenger vessel, and B the float carrying the motor and fitted with one or more suitable propellers C.

Connection between the float B and the vessel A may be made by means of coupling-rods E E', hinged or pivoted to the latter and connected to the former, the whole being so arranged that either the float or the vessel may rise and fall to a limited extent without the connection between the two being severed.

The float B, carrying the motor, gear, and propeller C, (the first two being preferably inclosed in a water-tight compartment,) may be of any suitable shape, and is controlled as to speed and direction from the passenger vessel by reins, as hereinafter described.

Any convenient motor may be used, and it may be operated by steam, oil, electricity, or in any other suitable manner; but preferably I make use of electricity, in which case the batteries are stored upon the vessel or in the motor-float, or partly in both, and the electricity is supplied to the motor by means of cables extending from the passenger vessel A through a flexible hose of rubber D or other suitable material to the float B. When I employ steam or oil to drive the motor, I of course provide means for the escape of vapors, &c.

The coupling consists of two rods E E', pivoted to the bow of the boat and arranged to engage within spring coupling-boxes F F', attached to the stern of the float B, the construction being so arranged as to permit of a horizontal and a slight longitudinal movement of the boat or float.

I preferably provide one of the boats with retarding-flaps or similar devices G G', hinged or pivoted, preferably, above the water-line. These are arranged to act as brakes when required and are operated from the vessel in a vertical plane by levers, reins, or other connections. The brakes can be actuated independently one of the other, so that they can thus be utilized for steering purposes, and when not in use they may be suspended above the water-level by means of a spring-catch or otherwise.

I have illustrated on Figs. 4 and 5 a suitable apparatus for steering and controlling the motor-float from the vessel, which comprises a pivoted lever H, the upper portion H' of which is capable of turning on its axis through a predetermined arc. This upper portion may also consist of a sleeve capable of turning upon the lower portion of the pivoted lever. The reins or ropes I are attached to a head K, secured upon the upper portion of this lever, by means of which the lever can be caused to partly rotate in either direction on pulling one or the other of the reins. The lower portion H² of this pivoted lever carries, in case of an electrical motor, a suitable contact device L, so arranged that the current from the storage batteries may be switched on or off, and in the event of both reins being pulled simultaneously the circuit will be broken. On releasing the reins the contact is remade by means of an adjustable spring operating the lever. In some cases I may arrange for the lower portion of the lever to act as a graduated switch, the speed of the motor being thereby regulated. A lower head K' is connected to the lever, from which reins I' lead back to the retarding devices G G', so that on the rotation of the lever by the reins I one or the other of the retarders will be lowered into the water. The upper ropes I are extended into a position convenient to be grasped by the occupant of the rear or passenger or goods vessel.

The passenger or goods vessel may be of any suitable shape, and, if desired, I may arrange seats therein to resemble those of a wagonette, the driver thus occupying a seat in the front portion of the boat, the seat being provided with a back, which may be movable or otherwise.

Having now described my invention, what I claim as new, and desire to secure by Letters Patent, is—

1. In combination, the front propelling vessel carrying a suitable motor, a rear vessel connected thereto, a device for controlling the motor of said front vessel, retarding devices carried by said rear vessel, and means for simultaneously operating said controlling and retarding devices from the rear vessel, substantially as described.

2. In a motor-float, an apparatus for steering and controlling the same from the vessel propelled or drawn thereby, and consisting of a pivoted lever furnished at its upper end with a sleeve provided at its extremities with yokes and rotatable upon said lever, the upper yoke being furnished at its ends with reins or connections and the lower yoke with guide-lines connected with the boat-rudder or the brake-flaps for the purpose of steering the same, the said pivoted lever being provided at its lower end with a contact device adapted to normally engage, by means of a spring, a second contact and complete the electric circuit for operating the motor, the reins being thus for the purpose of opening or closing the electric circuit and consequently stopping or starting the electric motor, and also for determining the steering of the boat, substantially as described.

In witness whereof I have hereunto set my hand in presence of two witnesses.

T. GILBERT BOWICK.

Witnesses:
VICTOR F. FEENEY,
WALTER J. SKERTEN.